(12) United States Patent
Godshaw (10) Patent No.: US 6,318,552 B1
(45) Date of Patent: Nov. 20, 2001

(54) TWO COMPARTMENT WHEELED COMPUTER AND BUSINESS CASE

(75) Inventor: Donald E. Godshaw, Evanston, IL (US)

(73) Assignee: Travel Caddy, Inc., Des Plaines, IL (US)

( * ) Notice: Subject to any disclaimer, the term of this patent is extended or adjusted under 35 U.S.C. 154(b) by 0 days.

(21) Appl. No.: 09/480,968

(22) Filed: Jan. 14, 2000

Related U.S. Application Data (63) Continuation-in-part of application No. 09/217,559, filed on Dec. 21, 1998, now abandoned.

(51) Int. Cl.[7] .................................................. B65D 85/00
(52) U.S. Cl. ........................ 206/320; 206/523; 206/592; 190/127; 190/109
(58) Field of Search .................................. 206/320, 576, 206/523, 592, 594; 190/102, 103, 109, 115, 121, 122, 127, 903, 18 A, 124, 125, 126; 250/37

(56) References Cited

U.S. PATENT DOCUMENTS

| | | | |
|---|---|---|---|
| 2,159,995 | * 5/1939 | Lifton | 190/103 |
| 3,443,671 | * 5/1969 | Dyke | 190/109 |
| 4,913,074 | * 4/1990 | Saliba | 190/125 |
| 4,932,506 | * 6/1990 | Kim | 190/111 |
| 5,010,988 | * 4/1991 | Brown | 190/104 |
| 5,160,001 | * 11/1992 | Marceau | 190/102 |
| 5,167,306 | * 12/1992 | Carrigan, Jr. | 190/18 A |
| 5,217,119 | * 6/1993 | Hollingsworth | 206/583 |
| 5,423,404 | * 6/1995 | Shaw | 190/102 |
| 5,476,184 | * 12/1995 | Hill | 190/107 |
| 5,526,908 | * 6/1996 | Wang | 190/115 |
| 5,782,325 | 7/1998 | O'Shea et al. . | |
| 5,881,850 | * 3/1999 | Murdoch | 190/110 |
| 6,000,509 | * 12/1999 | Chisholm | 190/109 |
| 6,062,357 | * 5/2000 | Bogert | 190/18 A |
| 6,068,095 | * 5/2000 | Glembocki et al. | 190/127 |

\* cited by examiner

*Primary Examiner*—Shian Luong
(74) *Attorney, Agent, or Firm*—Banner & Witcoff, Ltd.

(57) ABSTRACT

A multiple compartment, wheeled computer carrier and business case includes three separable compartments which are hinged together along their bottom edge one to the other with the center compartment for carriage of a personal computer and the side compartments comprising elements for carrying files and for carrying various other business items. The case is wheeled with a telescoping handle and further includes a carrier handle as well as a strap. A reinforcing gusset connecting the bottom of the separate compartments facilitates the security of the carrier case.

10 Claims, 9 Drawing Sheets

TWO COMPARTMENT WHEELED COMPUTER AND BUSINESS CASE

CROSS REFERENCE TO RELATED APPLICATION

This is a continuation-in-part of application Ser. No. 09/217,559 filed Dec. 21, 1998 now aband., for "Two Compartment Wheeled Computer And Business Case" which is incorporated herewith by reference.

BACKGROUND OF THE INVENTION

This invention relates to a business case or luggage item designed for carrying a personal computer and other business items including folders, small calculators and writing instruments.

Business travelers increasingly travel with their personal computer. A personal computer often requires some additional components such as extra batteries, electric connectors, and the like for use at a remote business site. Additionally, the business traveler often desires to include paper folders, writing instruments, and other business items, preferably in the same convenient and compact briefcase used to carry a personal computer. An assembly of such items often is bulky and heavy. Thus, there has developed a need for a case which conveniently carries such items in a compact and protected manner. This need, among others, inspired the development of the present luggage item.

SUMMARY OF THE INVENTION

In a principal aspect, the present invention comprises a business case which includes a telescoping handle, a carrying handle, a strap and three adjacent compartments with the center compartment designed for carrying a personal computer and the side compartments designed for carrying other items and which may serve as a protective layer, or buffer, for the center compartment. The case or luggage thus includes a first, generally parallelpiped side compartment which serves as the foundation for the case and which includes the telescoping handle as well as paper file retainers. The center compartment is hinged to the first or outside compartment along their bottom edges. The center compartment includes padded internal sides which are attached by straps to retain a personal computer. The third compartment comprises a pouch which is attached to the opposite side of the middle or second compartment and provides for storage of various items such as pencils, recorders, address books and other items in an organized fashion.

Thus, it is an object of the invention to provide a wheeled computer and business case.

It is a further object of the invention to provide a computer case which includes a telescoping handle for ease of transport while additionally including a handle and strap for carrying the case.

Another object of the invention is to provide a personal computer case which provides enhanced protection of the computer against damage and buffeting.

Another object of the invention is to provide an improved personal computer and business case which includes separate compartments for a personal computer, business files, and other items, all in an organized fashion.

These and other objects, advantages and features of the invention will be set forth in the detailed description which follows.

BRIEF DESCRIPTION OF THE DRAWING

In the detailed description which follows, reference will e made to the drawing comprised of the following figures.

DESCRIPTION OF THE PREFERRED EMBODIMENT

Referring to the figures, the luggage item or case of the invention is designed especially for the business traveler and includes three separable compartments. The first compartment 10 is provided for storage of paper files typically. The second or middle compartment 12 is designed for storage of a personal computer. The third compartment 14 is designed for carrying additional items such as a small tape recorder, pencils, an address book, extra paper, etc.

The assembled compartments 10, 12, 14 have a generally rectangular parallelpiped configuration and preferably conform with airline regulations concerning size or dimensions for carry-on luggage. The assembly of the three compartments in a fully assembled and closed state will generally conform with current airline regulations precluding a length exceeding twenty-two inches. a width of nine inches, and a height of fourteen inches. The configuration may be changed, or altered, however, to any dimensional size, so as to fulfill the business needs, or other needs of the consumer.

The outside or first compartment 10 includes a telescoping handle 16 fitted into or integrated with a back side 18 of the compartment 10 midway between opposite lateral sides 20, 22. The compartment 10 thus includes opposite lateral sides 20 and 22, as well as a bottom side 24 and a top side 25. Internal file folders or separators 26 may be incorporated in the enclosure defined by the sides 18, 20, 22, 24, 25. Flexible straps 28 connect the first compartment 10 with middle compartment 12. The compartments 10 and 12 are connected along their bottom sides by a flexible hinge. The outer or first compartment 10 further includes a wheel 30 and 32 in housings 17, 19 at each corner junction of bottom side 24 with back side 18. Additionally, the bottom side 24 includes a stiffening gusset or member 34 which extends along the entire bottom of the first compartment 10 and the bottom of the second compartment 12 in the preferred embodiment. The gusset 34 extends along the bottom side 24 and the backside 18 and is rigid and tends to restrict the amount of flexure and thus the amount of pivoting of the first compartment 10 relative to second compartment 12.

Figure 1:
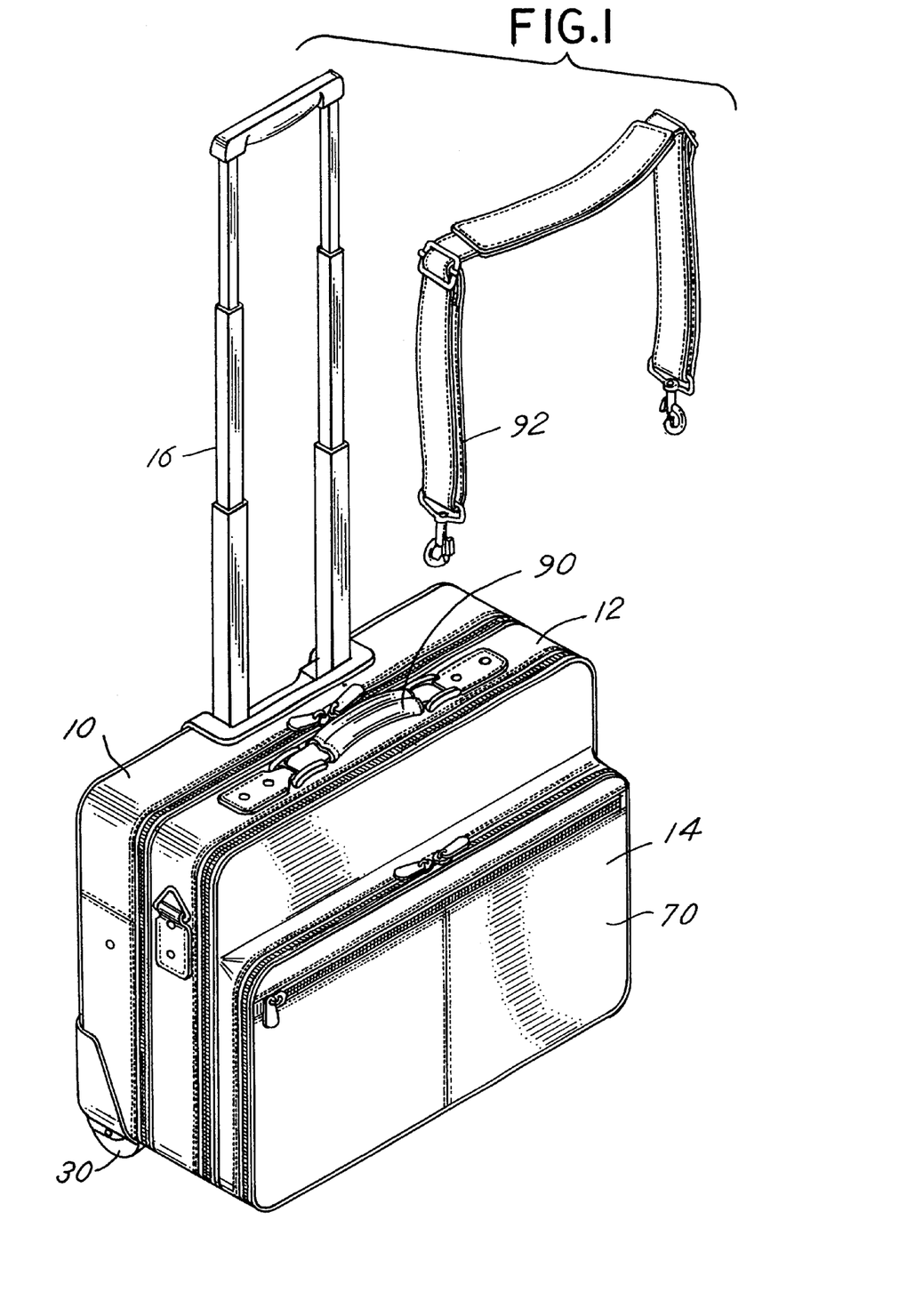
FIG. 1 is an isometric view of the luggage item or case of the invention wherein the three separate compartments are closed and a telescoping luggage handle is extended.
Figure 2:
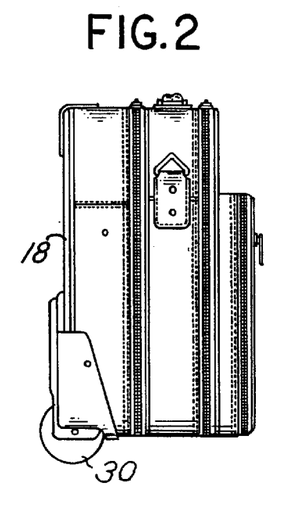
FIG. 2 is a side elevation of the case of FIG. 1.
Figure 3:
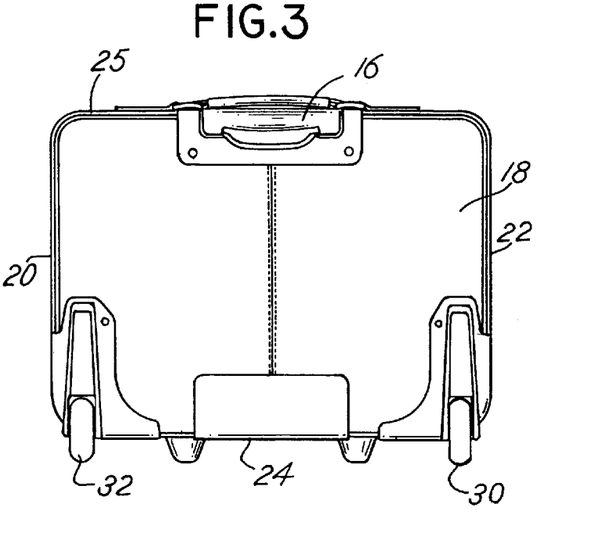
FIG. 3 is a back side elevation of the case of FIG. 1.
Figure 4:
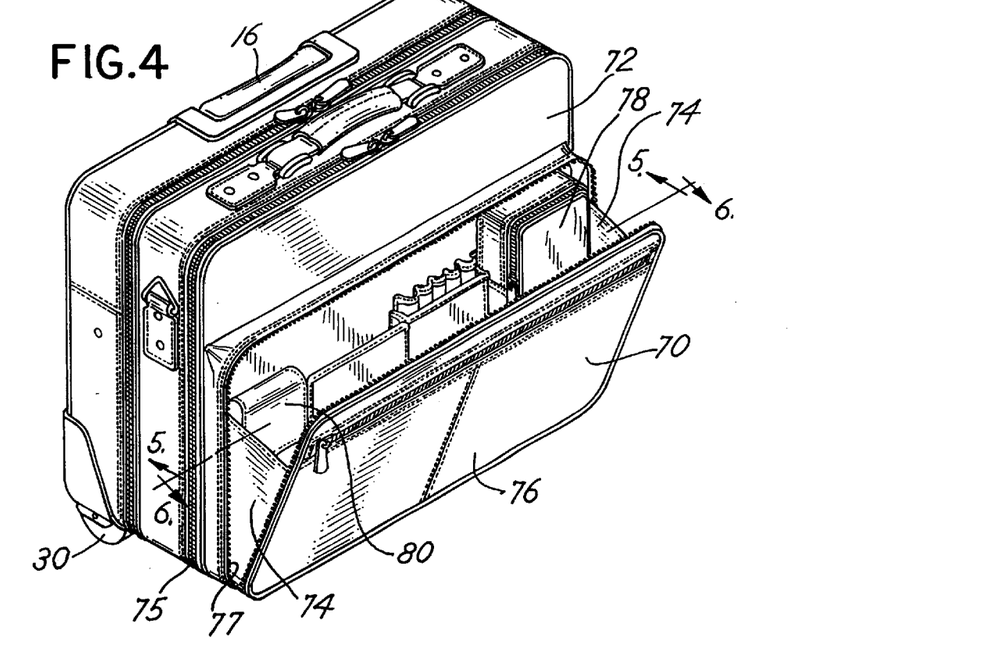
FIG. 4 is an isometric view illustrating the open front or forward compartment of the case.
Figure 5:
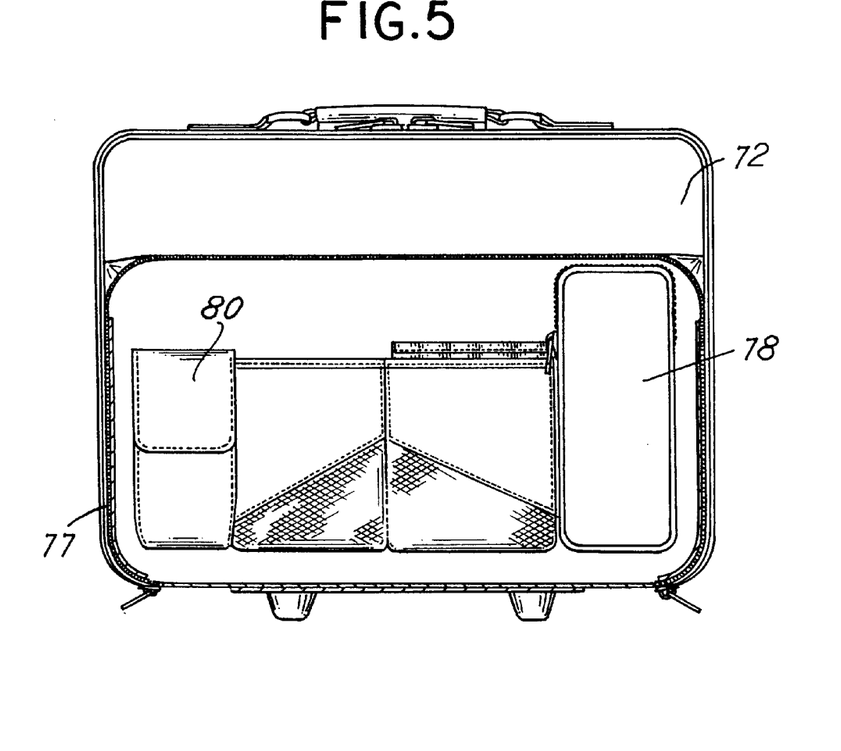
FIG. 5 is a cross sectional view taken substantially along the line 5—5 in FIG. 4.
Figure 6:
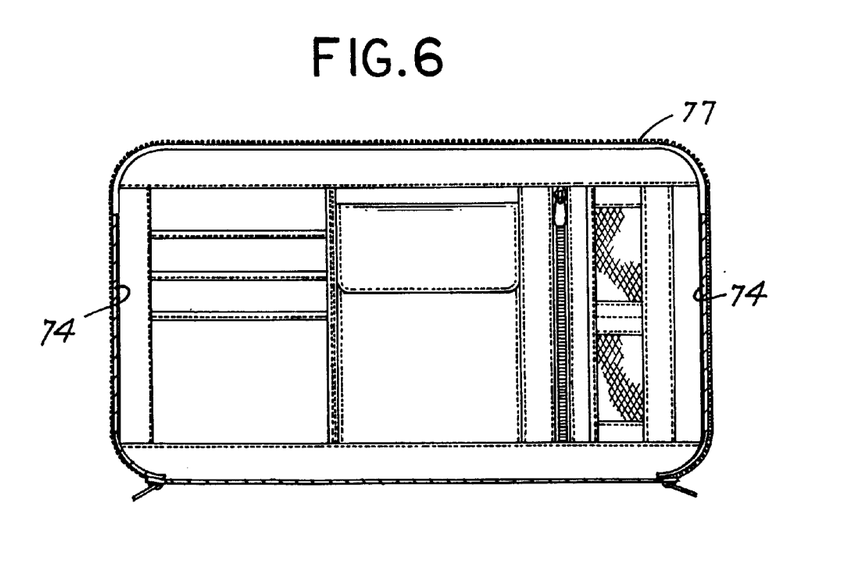
FIG. 6 is a cross sectional view taken along the line 6—6 in FIG. 4.
Figure 11:
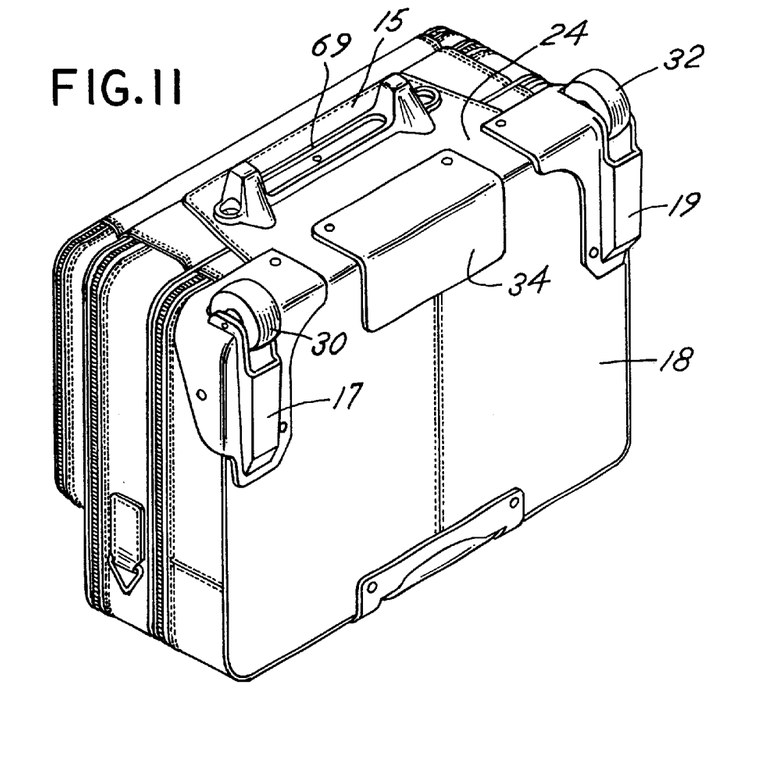
FIG. 11 is a bottom isometric view of the case.
Figure 12:
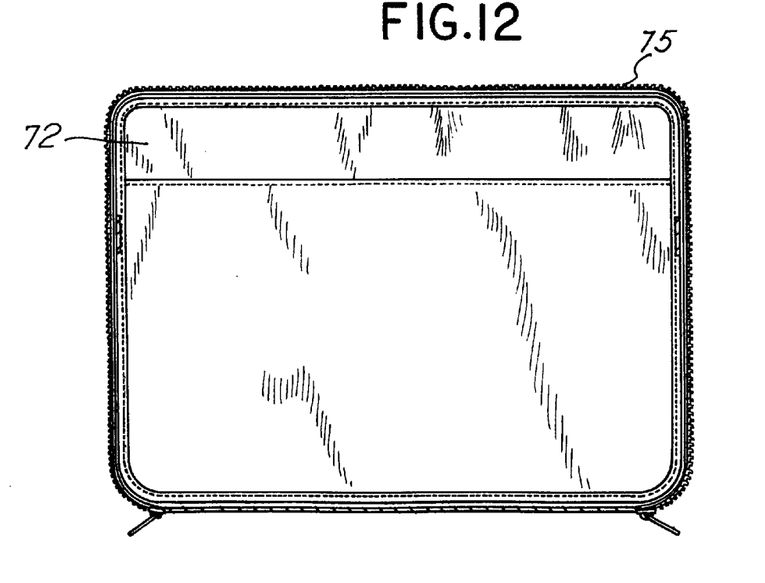
FIG. 12 is a front side elevation of the case of FIG. 1.
Figure 17:
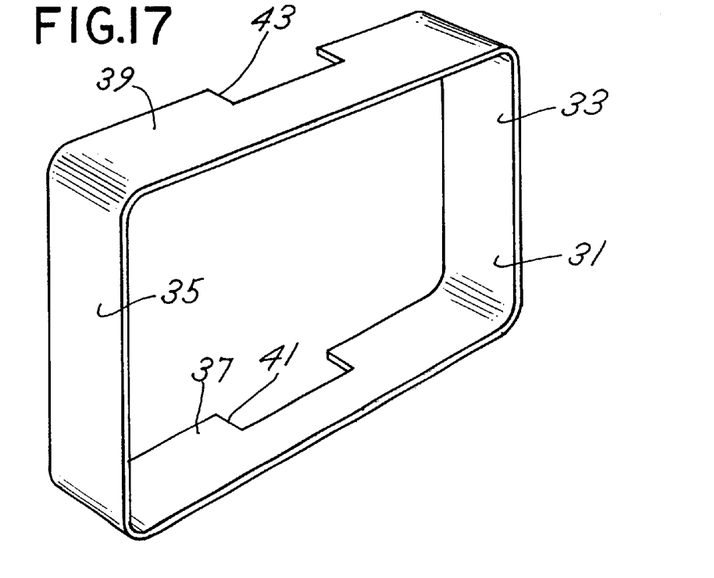
FIG. 17 is an isometric view of the frame associated with the outside compartment which receives the telescoping handle for the case of the invention.
Figure 18:
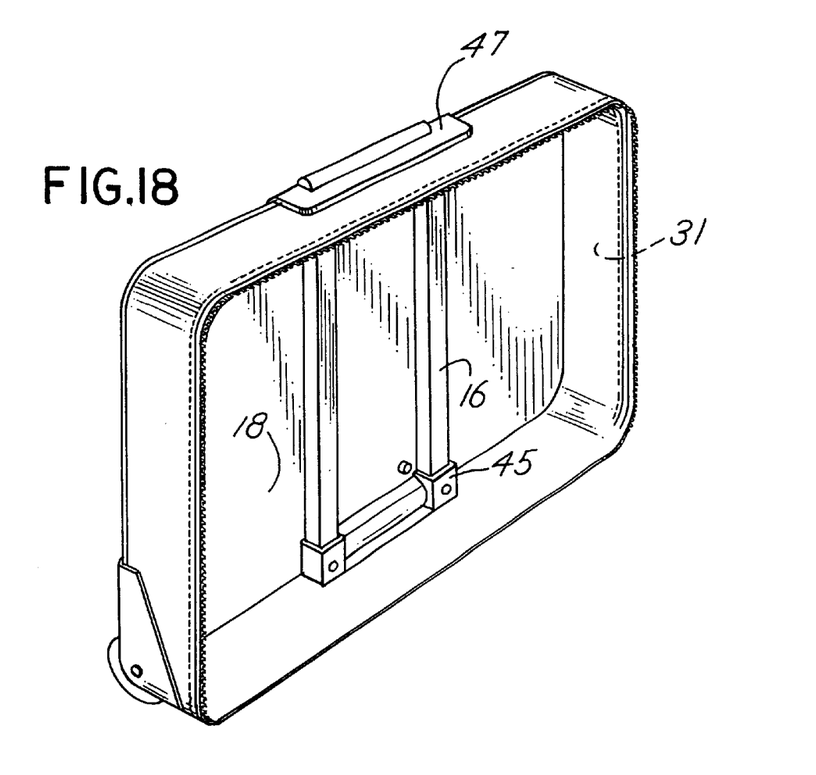
FIG. 18 is an isometric view of the interior of the case of the invention which utilizes the frame of FIG. 17 depicting the position of the carrier case telescoping handle.

FIGS. 17 and 18 depict a frame 31 which is provided on the inside of the first compartment 10 defining the shape or configuration of the first compartment 10. The frame 31 includes spaced, parallel sides 33 and 35, a bottom run 37 and a top run 39. Importantly, the bottom and top runs 37, 39 include respectively an inset or cut out section 41 and 43 which are formed vertically one above the other which have the same shape and configuration and which are located generally midway between sides 33, 35. Thus, the frame 31 is a generally rigid frame formed from a preformed molded plastic material, for example. The cut out sections 41 and 43 serve as channels for receipt and acceptance of the telescoping handle 16. The telescoping handle 16 thus fits downwardly flush with the bottom surface of the lower run 37 of the frame 31 and is retained there by a bracket 45 which is fixed to back panel 24. The gusset 34 depicted in FIG. 11 provides an element against which the lower end of the telescoping handle 16 fits. The telescoping handle 16 projects upwardly through the section 43 of the upper run 39 and may be telescoped in the fashion depicted in FIG. 1. A molded plastic frame 47 may be provided to facilitate and retain the telescoping handle 16.

With the described construction, it is possible to provide a telescoping handle 16 which telescopes a greater distance than known prior art handles inasmuch as the handle 16 is extended downwardly through the frame 31 to the bottom surface of run 37. Thus, the extra extension provides for additional length of the handle 16 when it is telescoped by at least the multiple of the sections of the handle 16 times the depth or thickness of the lower run 37.

First compartment 10 is flexibly hinged to second compartment 12 by a bottom side 24 band or fabric hinges and extension 1 5 which also connects to the bottom side of the third compartment 16. The second compartment 12 is similarly constructed of a top side 40, a first lateral side 42, a second lateral side 44, and a bottom side 46 thereby forming a rectangular frame which is of congruent shape with the rectangular frame or shape defined by the sides 20, 22, 24, 25 of the first compartment 10. Retention straps 48 and 49 and support pads 50 buffer a personal computer retained by the removable straps 48, 49 and a hinged flap 51 within the compartment 12. The compartment 12 is also sandwiched between the compartments 10 and 14 and their contents further protect the contents of compartment 12.

Figures 7, 8:
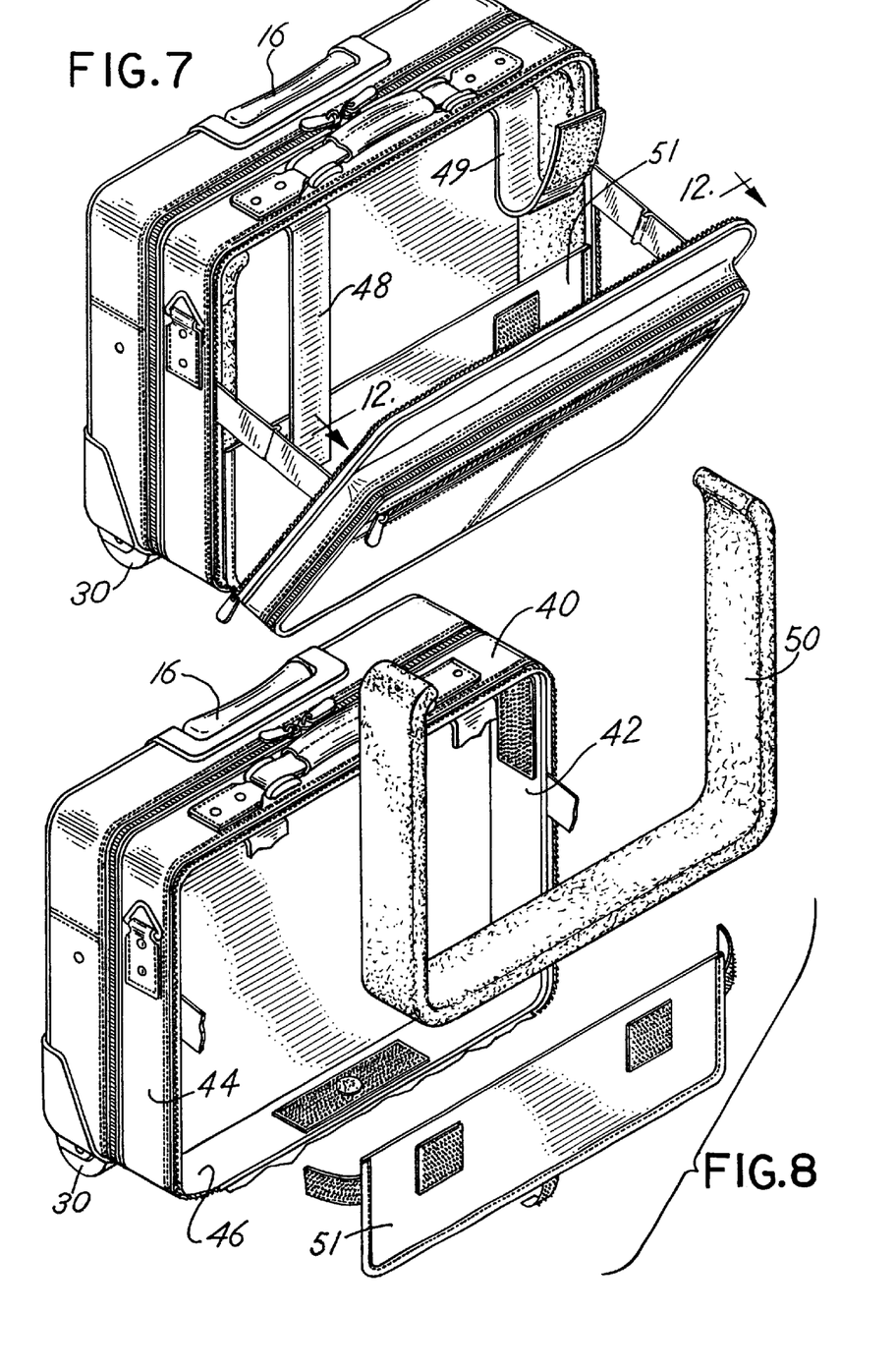
FIG. 7 is an isometric view illustrating access to the interior compartment of the case.
FIG. 8 is an exploded isometric view of the case as depicted in FIG. 7.
Figure 9:
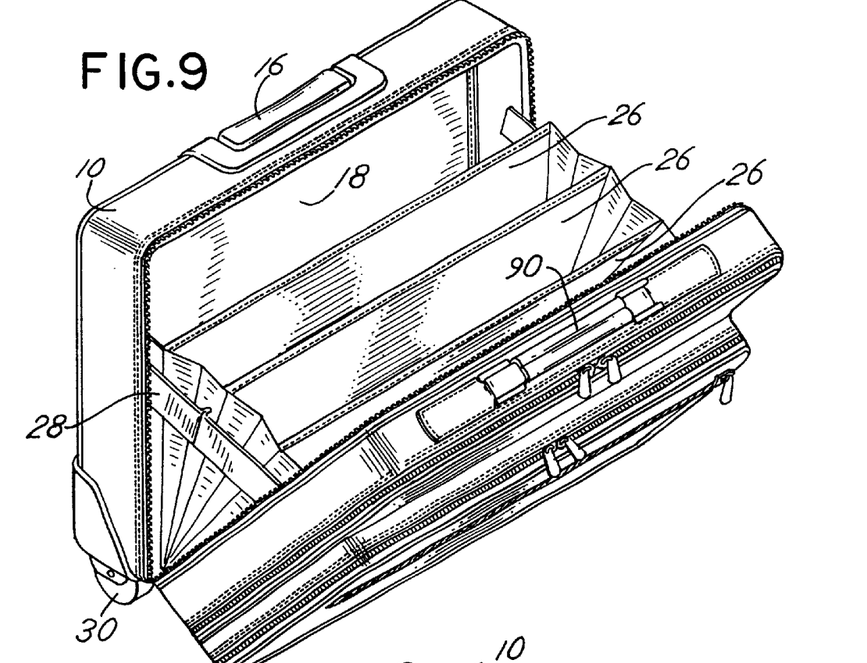
FIG. 9 is an isometric view illustrating the opening of the side compartment comprising the case.
Figure 10:
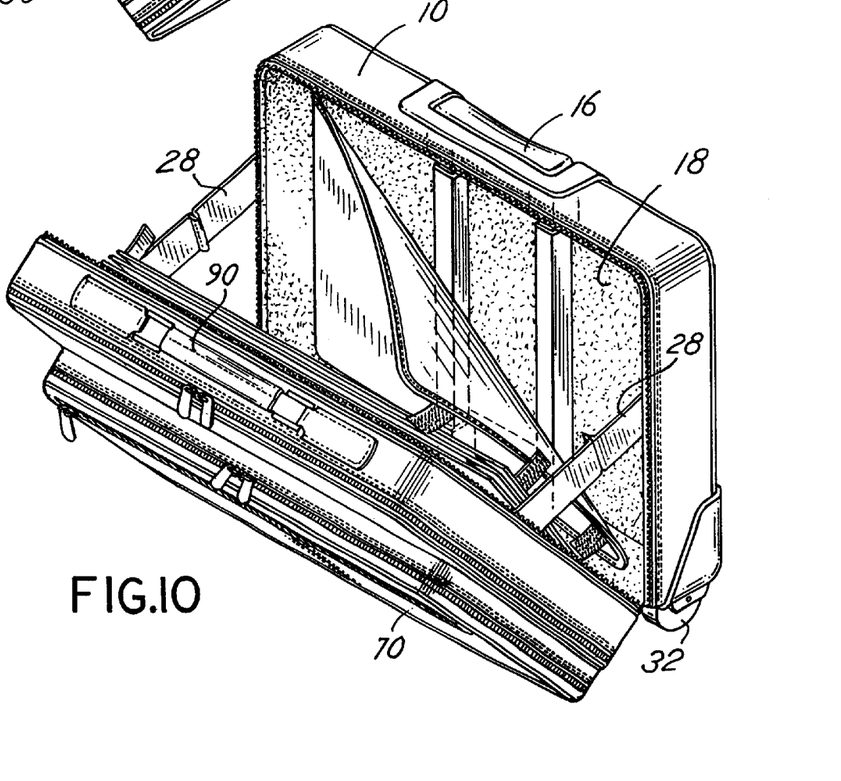
FIG. 10 is an isometric view illustrating the position of the handle in the third or side compartment of the case as depicted in FIG. 9.
Figures 13, 14:
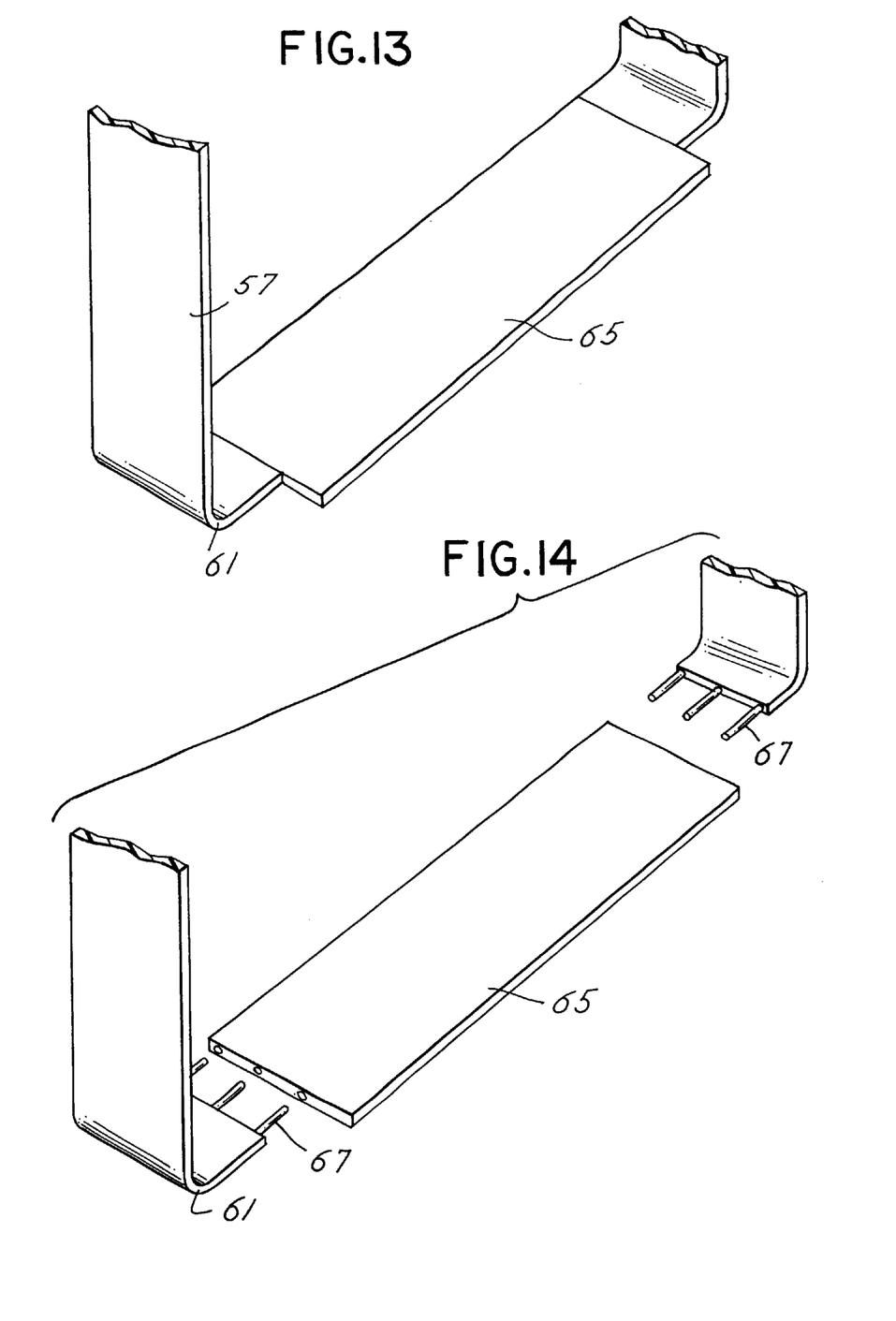
FIG. 13 is a partial cut away view of the internal frame for the middle compartment forming the case.
FIG. 14 is an exploded view of the frame of FIG. 13.
Figure 15:
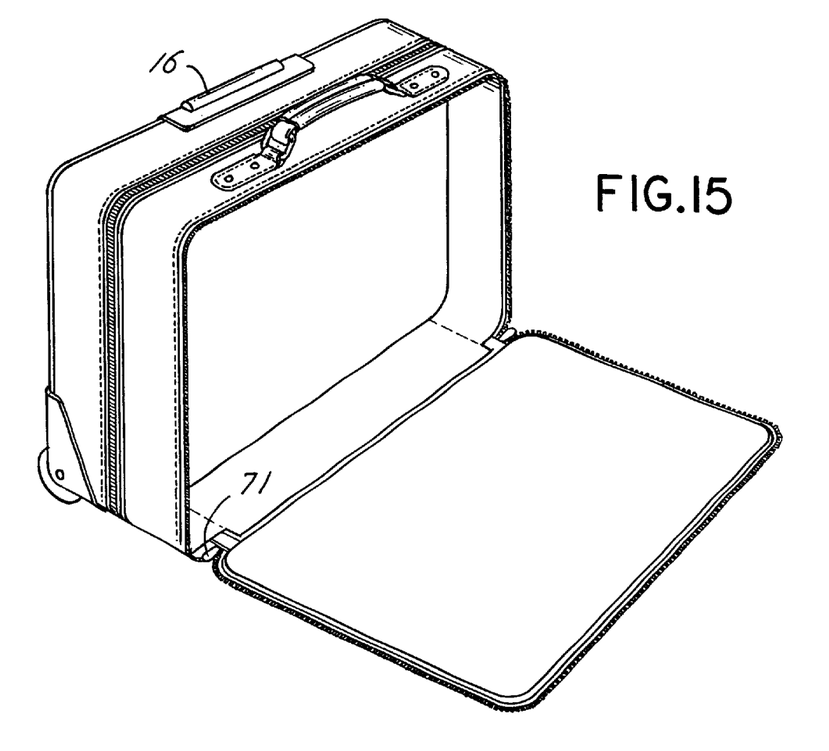
FIG. 15 is an isometric view illustrating the interior of the middle compartment of the case wherein the frame of FIG. 13 is positioned therein.
Figure 16:
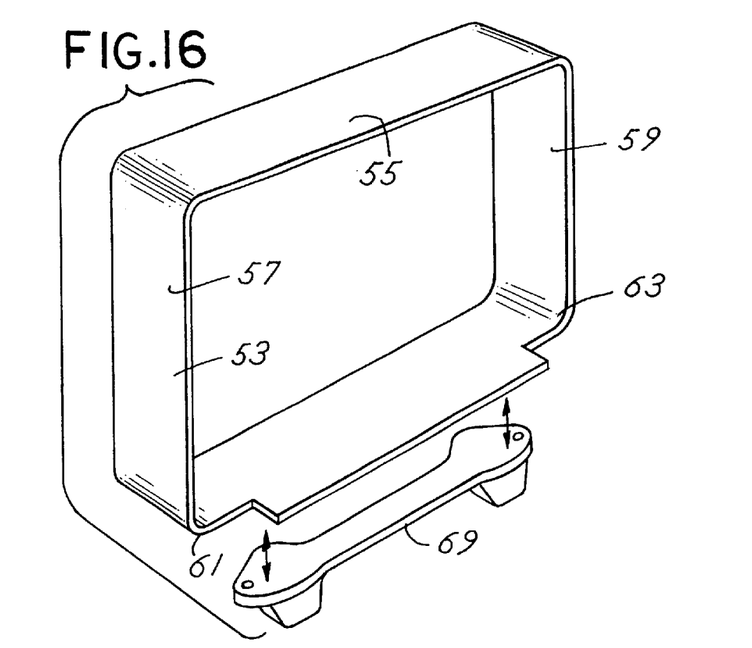
FIG. 16 is an isometric view of the frame and support foot associated with the compartment depicted in FIG. 15.

FIG. 8 depicts the second compartment 12 having an internal frame defining the shape of the compartment wherein all of the frame members are of equal width and in the shape of a rectangle. However, as depicted in FIGS. 13–15, a preferred construction of the invention comprises a rectangular frame 53 wherein a bottom run 65 of the frame 53 has a different and greater width than the remaining three sides of the frame 53. More specifically, referring to the figures, a generally rigid frame 53 is formed of a three-sided, pre-molded or pre-formed section including a top run 55 and spaced downwardly depending integrally connected side runs 57 and 59. The side runs 57 and 59 each bend inwardly at lower corners 61 and 63 and connect with a lower separate run 65. The lower separate run 65 has a width which is greater than the width of the other runs defining the frame 53. The frame 53 is connected with the lower run 65 by means of pins 67 which project from the formed section 53 and join with the planar lower run 65.

By constructing a frame for the middle or central compartment 12 in the manner described, it is possible to attach a support foot 69 at a position extended outwardly from the base of the center section 12. Thus, referring to FIG. 11, there is depicted a foot 69 which is attached generally at the midpoint of the compartment 12. However, with the alternative construction depicted by FIGS. 13–15, it is possible to move the foot 69 a further distance from the gusset 34 and toward the third pouch 16 or to underlie the third pouch 16. In this manner, the stability of the case is enhanced.

Further, by providing a lower run 65, it is possible to provide a construction wherein a zipper 71 may more easily track around the total periphery of the case 11 and along a portion of the bottom thereof as depicted in FIG. 15. Thus, the width of the lower section 65 is greater than the width of the remaining frame 53 and the length from side to side of the lower section 65 is less than the length of the top run 55.

The center compartment 12 further includes an outside carrier handle 90 and an outside optional strap 92. The case is more easily balanced by attaching the strap 92 and carrier handle 90 to the center compartment 12. Additionally, the consumer using the case will thereby provide support to the most weighty or most heavy item being carried; namely, the personal computer.

The third compartment 14 is comprised of a pouch 70 which is attached to a front side panel 72 fitted over the sides 40, 42, 44, 46 of the second compartment 12. The front panel 72 is attached by means of a zipper 75 to the sides 40, 24, 44, 46 defining the frame for the second compartment 12.

Pouch 70 includes a front panel 76 hinged along its bottom edge and attached by a zipper 77 along the remaining three edges. A gusset 74 limits the opening of panel 76. Various pockets 78, 80 are provided on the inside of the pouch 70 for retention of items such as writing instruments recording devices, note pads, etc.

The use of the bottom gusset 34 is especially important to provide enhanced rigidity to the case enabling the use of the telescoping handle 16 and to provide appropriate integrity to the other elements of the case enabling improved protection of a personal computer which is being carried in the case. Various components and elements of the case or item of luggage may altered or changed without departing from the spirit and scope of the invention. Thus, the invention is to be limited only by the following claims and equivalents thereof.

What is claimed is:

1. A multiple compartment, wheeled, computer carrier and business case comprising, in combination:
   a first generally rectangular, parallelepiped, outside compartment having a back side, a top side, a bottom side and opposite lateral sides all of said sides joined together to define an enclosure, said back side having integrated therein a telescoping handle positioned substantially midway between the opposite lateral sides, a pair of wheels in the junction of the bottom side and back side;
   a second generally rectangular parallelepiped, middle computer storage compartment having a top side, a bottom side and opposite lateral sides, the second compartment bottom side being hinged to the first compartment bottom side, the remaining sides of the second compartment aligned edge to edge with the corresponding top and lateral sides of the first compartment and releasibly joined thereto, said first and second compartments pivoted about a bottom hinge junction by at least one first flexible band connecting the first and second compartment bottom sides to limit their relative movement about the bottom hinge junction;

said second compartment further including an outside rectangular panel with an outside face, said second compartment outside rectangular panel hinged along one side to the second compartment bottom side and releasibly attached to an outside periphery of the opposite sides and top side of the second compartment;

a pouch attached to the outside face of the outside panel of the second compartment, said pouch fitted over a majority of the surface area of the outside panel of the second compartment; and said first flexible band extending from a lower edge of the back side of the first compartment and attached to the bottom sides of the compartments, said first compartment including a rigid rectangular frame having spaced side runs, a top run and said bottom side including a rigid bottom run, said top and bottom runs including a cutout section for receipt of the telescoping handle projecting simultaneously through both runs to provide extra telescoping length for extension of the telescoping handle.

2. A multiple compartment, wheeled, computer carrier and business case comprising, in combination:

a first generally rectangular, parallelepiped, outside compartment having a back side, a top side, a bottom side and opposite lateral sides all of said sides joined together to define an enclosure, said back side having integrated therein a telescoping handle positioned substantially midway between the opposite lateral sides, a pair of wheels in the junction of the bottom side and back side;

a second generally rectangular parallelepiped, middle computer storage compartment having a top side, a bottom side and opposite lateral sides, the second compartment bottom side being hinged to the first compartment bottom side, the remaining sides of the second compartment aligned edge to edge with the corresponding top and lateral sides of the first compartment and releasibly joined thereto, said first and second compartments pivoted about the bottom hinge junction and at least one first flexible band connecting the first and second compartments to limit their relative movement about the bottom hinge connection;

said second compartment further including an outside rectangular panel with an outside face, said rectangular panel hinged along one side to the second compartment bottom side and releasibly attached to an outside periphery of the opposite sides and top side of the second compartment;

a pouch with a bottom side attached to the outside face of the outside panel of the second compartment, said pouch fitted over a majority of the surface area of the outside panel of the second compartment;

said first flexible band extending from a lower edge of the back side of the first compartment and attached to the bottom sides of the first and second compartments; and said second compartment including a rigid rectangular outer frame congruent with the top, bottom and lateral sides, said frame having spaced side runs, a top run and a bottom run wherein the bottom run has, at least in part, a bottom run frame section with a width greater than the side runs and top run; and a support foot underlying the bottom run frame section of the inner frame positioned against the bottom run and spaced outwardly from the back side of the first outside compartment for enhancing the stability of the wheeled carrier.

3. The carrier of claim 1 or 2 further including a rigid gusset against the back side and bottom side of the first compartment to further stiffen the carrier and case.

4. The carrier and case of claim 1 or 2 wherein the pouch includes a bottom side coplanar with and connected to the bottom side of the second compartment, and wherein the pouch further includes opposite end sides, a top side and an outside panel, said top and end sides of said pouch fixed to the outside panel of the second compartment to define an enclosure, said outside panel of said pouch being hinged to the bottom side of the pouch to permit access to the pouch.

5. The carrier and case of claim 1 or 2 wherein the second compartment includes at least partially padded inside surfaces and panels to cushion and store a computer.

6. The carrier and case of claim 1 or 2 wherein the top side of the second compartment includes an outside carrier handle.

7. The carrier and case of claim 1 or 2 further including releasable straps in the second compartment for retaining a computer therein.

8. The carrier and case of claim 1 or 2 further including pouches in the pouch.

9. The carrier and case of claim 1 or 2 further including a divider assembly in the first compartment.

10. The carrier and case of claim 1 or 2 further including an array of dividers in the first compartment and the pouch, and retaining straps in the second compartment for retaining and protecting a computer in the second compartment.

* * * * *